Feb. 17, 1931.  I. LANGMUIR  1,793,329

CIRCUIT CONTROL APPARATUS

Filed April 16, 1926

TO MEASURE HIGH PEAK VOLTAGE

TO MEASURE LOW PEAK VOLTAGE

Inventor:
Irving Langmuir,
by *Alexander S. ...*
His Attorney.

Patented Feb. 17, 1931

1,793,329

UNITED STATES PATENT OFFICE

IRVING LANGMUIR, OF SCHENECTADY, NEW YORK, ASSIGNOR TO GENERAL ELECTRIC COMPANY, A CORPORATION OF NEW YORK

CIRCUIT-CONTROL APPARATUS

Application filed April 16, 1926. Serial No. 102,597.

My invention relates to apparatus for controlling the connections of electric circuits, and has for its principal object the provision of an improved circuit control apparatus wherein the use of mechanical contacts to close and open the circuit is avoided. A further object is the provision of an apparatus that may be utilized to interrupt a circuit when the voltage of this or another circuit exceeds a predetermined value.

Various arrangements wherein electric valve devices are utilized to control the connections of a circuit have been proposed in the past. In the operation of these arrangements, it is customary to control the circuit by change in the potential of a grid or control electrode provided for controlling the transmission of current between the cathode and anode of the valve. The facility with which control of the circuit is effected by change in the grid potential of the valve, however, is dependent on the grid construction and operating characteristics of the valve.

It is well known that a grid interposed between the cathode and anode of a vapor electric device, such as the mercury rectifier for example, will prevent starting of the current when charged to a negative potential of sufficient magnitude, but that it is incapable of stopping the current after it has started. Likewise, in the case of a low vacuum valve comprising a heated cathode, it is impossible to interrupt the transmission of current therethrough by changes in grid potential. In accordance with my invention, the grid or control electrode potential of the valve is maintained at a negative potential of sufficient magnitude to prevent starting of the current when the valve is deionized and means are provided for neutralizing the voltage drop of the valve long enough to permit deionizing of the valve and interruption of the current.

My invention will be better understood from the following description when considered in connection with the accompanying drawings, and its scope will be pointed out in the appended claims.

Figure 1:
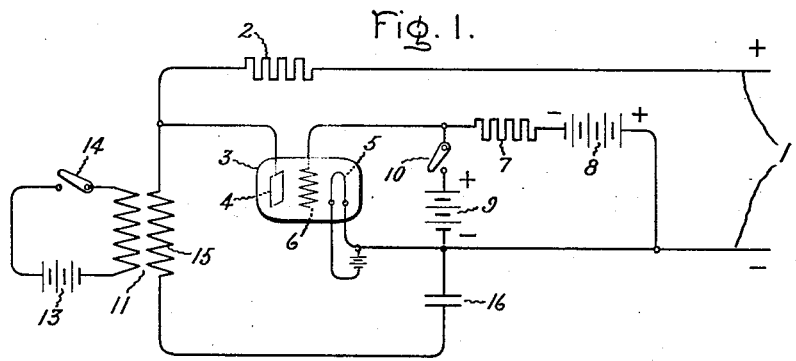
Figure 2:
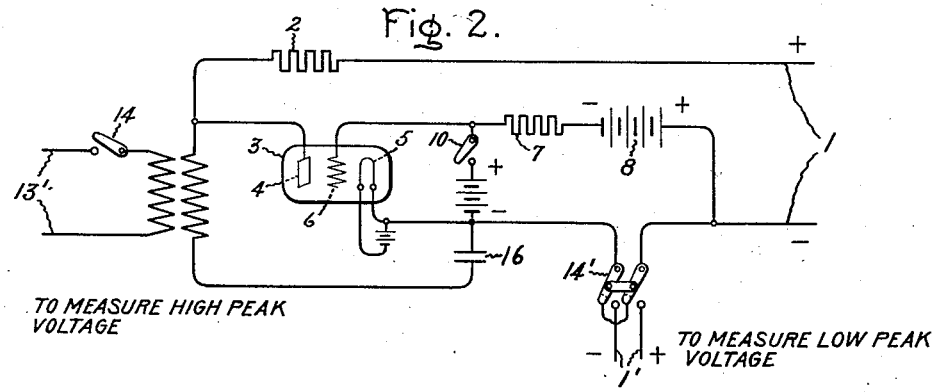

Referring to the drawings, Fig. 1 shows a circuit control apparatus comprising means for producing an inductive kick whereby the voltage of a valve connected in the circuit to be controlled is temporarily neutralized; and Fig. 2 shows a modified form of circuit control apparatus that may be utilized to open a circuit in response to either a high or low peak voltage.

Fig. 1 shows a direct current circuit 1 connected to a consumption device shown as a resistor 2 through a low vacuum electric valve 3 comprising an anode 4, a cathode 5 and a grid 6 which is connected to the cathode 5 through a resistor 7 and a source of current shown as a battery 8. A battery 9 is arranged to be connected between the grid 6 and cathode 5 by a switch 10 for raising the grid potential to a value permitting the transmission of current through the valve 3. A transformer 11 provided with a primary winding arranged to be connected to a source of current 13 through a switch 14 and with a secondary winding 15 connected between anode 4 and cathode 5 through a condenser 16 is provided for temporarily stopping the transmission of current through the valve. The switches 10 and 14 may be biased to their open positions by any suitable means.

Assuming the valve control switches 10 and 14 to be in their illustrated open poistions, no current is supplied to the device 2 upon energization of the direct current line 1 because a negative potential dependent on the battery 8 is applied to the grid 6 and the valve 3 is maintained closed. Opening of the valve 3 is produced by operation of the switch 10. When this switch is closed for an instant, the grid potential is raised by the battery 9 to a value high enough to open the valve and permit the transmision of current therethrough. Opening of the switch 10 restores the grid potential to its former value but is ineffective to close the valve. Closure of the valve is produced by closing switch 14 long enough to energize the transformer 11 and produce a transitory counter-voltage which stops the transmission of current through the valve long enough to permit deionization and closure of the valve due to the negative potential of its grid. The condenser 16 at all times prevents the transmission of direct current through the secondary circuit of transformer 11. Other means than the transformer 11 may be utilized to produce a transitory counter-voltage which effects closure of the valve.

Fig. 2 shows the apparatus of Fig. 1 as arranged either to close the valve 3 when a transitory voltage applied to a circuit 13' exceeds a predetermined value, or to open the valve 3 when the voltage of a circuit 1' exceeds a predetermined value. Assuming the switch 14 to be closed and the switch 14' to be in a position to complete the connections of the line 1 independently of the circuit 1' as illustrated, the valve 3 will be closed as previously explained when a transitory counter-voltage having a predetermined peak value is applied to the circuit 13'. Assuming that the switch 14 is open, that the valve 3 is not transmitting current, and that the circuit 1' is connected to the circuit 1 through the switch 14', no current will be transmitted through the valve so long as the voltage of the circuit 1' is low as compared to that of the source 8. As the voltage of the circuit 1' is increased, however, a value is finally reached at which the voltage of the grid 6 becomes sufficiently positive to open the valve 3. The apparatus of Fig. 2 may, therefore, be utilized either to indicate when a peak voltage comparable with that of the line 1 is applied to the circuit 13' or to indicate when a peak voltage comparable to that of the source 8 is applied to the circuit 1'.

The embodiments of the invention illustrated and described herein have been selected for the purpose of clearly setting forth the principles involved. It will be apparent, however, that the invention is susceptible of being modified to meet the different conditions encountered in its use, and I, therefore, aim to cover by the appended claims all modifications within the true spirit and scope of my invention.

What I claim as new, and desire to secure by Letters Patent of the United States, is:

1. The combination of a direct current circuit, an electric valve including a grid for controlling the transmission of current between an anode and cathode connected in said circuit, means connected with the grid for continuously applying a fixed negative potential thereto a second circuit, said second circuit including said anode and cathode and a winding in series therewith, and means including said second circuit for applying a transitory counter-voltage to the anode circuit of said valve whereby said valve is closed and the current transmitted through said circuit is interrupted.

2. The combination of a circuit, an electric valve including a grid for controlling the transmission of current between an anode and cathode connected in said circuit, means for continuously applying to said grid a fixed negative potential, a second circuit, said second circuit including said anode and cathode and a winding in series therewith, means including said second circuit for applying a transitory counter-voltage to said cathode and said anode for closing said valve and interrupting the current transmitted through said circuit, and means for raising the potential of said grid to open said valve.

3. In combination, a direct current circuit, a load device in said circuit, an electric valve having a control electrode and having an anode and a cathode connected with said circuit whereby load current in said circuit may be transmitted through said valve, means connected with the control electrode for applying continuously a constant negative potential thereto sufficient to prevent starting of current flow through the valve when the latter is deionized, a second circuit, said second circuit including said anode and cathode and a winding in series therewith and means including said second circuit for applying a transitory counter-voltage between said anode and cathode to neutralize the potential drop in the valve and to permit deionizing of the valve and interruption of load current flow therethrough.

In witness whereof, I have hereunto set my hand this 14th day of April, 1926.

IRVING LANGMUIR.